US011462105B2

(12) United States Patent
Pöschke (10) Patent No.: US 11,462,105 B2
(45) Date of Patent: Oct. 4, 2022

(54) SENSOR AND FILTER CONFIGURATION TO DETECT SPECIFIC WAVELENGTHS OF LIGHT

(71) Applicant: Accenture Global Solutions Limited, Dublin (IE)

(72) Inventor: Philipp Tim Pöschke, Munich (DE)

(73) Assignee: Accenture Global Solutions Limited, Dublin (IE)

( * ) Notice: Subject to any disclaimer, the term of this patent is extended or adjusted under 35 U.S.C. 154(b) by 154 days.

(21) Appl. No.: 16/922,455

(22) Filed: Jul. 7, 2020

(65) Prior Publication Data

US 2021/0375133 A1    Dec. 2, 2021

Related U.S. Application Data

(60) Provisional application No. 63/030,021, filed on May 26, 2020.

(51) Int. Cl.
| | |
|---|---|
| *G06K 9/00* | (2022.01) |
| *G08G 1/095* | (2006.01) |
| *G06T 7/90* | (2017.01) |
| *G08G 1/0962* | (2006.01) |
| *G06V 20/58* | (2022.01) |

(52) U.S. Cl.
CPC ............... *G08G 1/095* (2013.01); *G06T 7/90* (2017.01); *G06V 20/582* (2022.01); *G06V 20/584* (2022.01); *G08G 1/09623* (2013.01); *G06T 2207/30252* (2013.01)

(58) Field of Classification Search
CPC ............... G08G 1/095; G08G 1/09623; G06K 9/00818; G06K 9/00825; G06K 9/209; G06T 7/90; G06T 2207/30252; G02B 7/022
See application file for complete search history.

(56) References Cited

U.S. PATENT DOCUMENTS

| | | | |
|---|---|---|---|
| 10,735,699 B1 * | 8/2020 | Chan .................... | H04N 5/2351 |
| 2007/0008176 A1 | 1/2007 | Sirota et al. | |
| 2008/0143868 A1 * | 6/2008 | Tsuchiya .................. | G03B 7/18 |
| | | | 348/360 |
| 2016/0318490 A1 * | 11/2016 | Ben Shalom ...... | B60K 31/0008 |
| 2017/0075195 A1 * | 3/2017 | Stein .................... | H04N 5/2252 |
| 2018/0348596 A1 | 12/2018 | Reed et al. | |
| 2021/0168269 A1 * | 6/2021 | Wheatley ............. | H04N 5/2257 |

FOREIGN PATENT DOCUMENTS

| | | |
|---|---|---|
| KR | 20100104556 A | 9/2010 |
| WO | 2020026115 A1 | 2/2020 |

OTHER PUBLICATIONS

Extended European Search Report for Application No. EP21154161. 0, dated Jul. 5, 2021, 10 pages.

* cited by examiner

*Primary Examiner* — Dhaval V Patel (74) *Attorney, Agent, or Firm* — Harrity & Harrity, LLP (57) ABSTRACT

A sensor arrangement may include a light sensor, a lens, and a filter. The lens may include a distal end positioned toward an environment and a proximal end that is opposite the distal end and positioned toward the light sensor. The filter may be situated between the light sensor and the proximal end of the lens. The filter may be configured to permit a preconfigured set of wavelengths of light from the environment to be sensed by the light sensor.

20 Claims, 4 Drawing Sheets

SENSOR AND FILTER CONFIGURATION TO DETECT SPECIFIC WAVELENGTHS OF LIGHT

BACKGROUND

A vehicle (e.g., an autonomous vehicle, a vehicle having a driver assistance system, and/or the like) may include a traffic light detection system to detect and analyze light from a traffic signal. The traffic light detection system may include a camera having a lens (e.g., a fisheye lens, a telephoto lens, a wide angle lens, and/or the like), a filter (e.g., a bandpass filter, a shortpass filter, a longpass filter, and/or the like), a sensor (e.g., a complementary metal oxide semiconductor (CMOS) sensor, such as a light sensor, a vision sensor, and/or the like), and/or the like.

SUMMARY

According to some implementations, a sensor arrangement may include a light sensor, a lens, and a filter. The lens may include a distal end positioned toward an environment and a proximal end that is opposite the distal end and positioned toward the light sensor. The filter may be situated between the light sensor and the proximal end of the lens. The filter may be configured to permit a preconfigured set of wavelengths of light from the environment to be sensed by the light sensor.

According to some implementations, a sensor package may include a substrate, a light sensor, a mount structure, a lens, and a filter. The light sensor may be attached to the substrate. The mount structure may be attached to the substrate and may retain the light sensor within a receptacle portion formed by the mount structure. The filter may be situated within the receptacle portion and between the light sensor and the lens. The filter may be configured to permit a preconfigured set of wavelengths of light to pass from the lens to the light sensor.

According to some implementations, a traffic light detection system may include a plurality of lenses, one or more light sensors, and one or more filters. Each of the plurality of lenses may be configured to receive light from different fields of view. The one or more light sensors may be configured to sense light received from the plurality of lenses. The one or more filters may be situated between the one or more light sensors and the plurality of lenses. The one or more filters may be configured to permit wavelengths of light associated with a traffic signal to pass between the plurality of lenses and the one or more light sensors.

DETAILED DESCRIPTION

The following detailed description of example implementations refers to the accompanying drawings. The same reference numbers in different drawings may identify the same or similar elements.

To manage traffic flow in an urban environment, a municipality (e.g., via a department of transportation, and/or the like) may position one or more traffic signals at an intersection involving two or more streets. A traffic signal, of the one or more traffic signals, may include a set of different colored lights, including a red light, a yellow light, and a green light. Depending on which light of the set of different colored lights is illuminated (e.g., based on a previously-determined schedule, based on current traffic patterns, and/or the like), a vehicle traveling along one of the two or more streets may be required, by law, to perform certain actions. For example, when the green light is illuminated, the vehicle may be required to maintain forward motion toward and/or through the intersection. As another example, when the red light is illuminated, the vehicle may be required to stop prior to reaching the intersection. As a further example, when the yellow light is illuminated, which serves as a warning that illumination of the red light is imminent, the vehicle may be required to adjust speed to either travel through the intersection prior to illumination of the red light or stop prior to reaching the intersection.

To minimize traffic disruption and/or congestion, a first traffic signal, which is positioned to direct traffic along a first street, may be configured to coordinate illumination of the set of different colored lights with a second traffic signal, which is positioned to direct traffic along a second street that intersects with the first street. For example, when the first traffic signal illuminates the green light for vehicles traveling along the first street, the second traffic signal may illuminate a red light to stop vehicles on the second street from entering the intersection with the first street. Conversely, when the first traffic signal illuminates the red light for vehicles traveling along the first street, the second traffic signal may illuminate a green light to permit vehicles on the second street to enter the intersection with the first street. In some implementations, a traffic signal may include two sets of different colored lights (e.g., for opposing traffic along a single street), four sets of different colored lights (e.g., for opposing traffic along two streets), and/or the like.

Accordingly, to avoid collision with another vehicle, a person driving the vehicle and/or the vehicle itself must be able to visually perceive light from traffic signals. In some implementations, to assist the person driving the vehicle, the vehicle may include a driver assistance system (DAS). The DAS may include one or more light detection components to perceive and analyze a light from a traffic signal and assist the person to control the vehicle accordingly. In some implementations, the vehicle may be an autonomous vehicle and thus wholly rely on one more light detection components to perceive and analyze a light from a traffic signal and cause the vehicle to react accordingly. Depending on weather, time of day, and/or an angle of view of the traffic signal, the person and/or the vehicle may experience difficulty in accurately perceiving whether the light is red, yellow, or green.

Failure to accurately perceive a color of the light, whether due to human error or an issue with the one or more light detection components, may result in the vehicle breaking one or more laws, being involved in a collision, and/or the like. For example, due the vehicle breaking one or more laws, a law enforcement agency may consume resources (e.g., computing resources, network resources, vehicle resources, and/or the like) detecting that the vehicle broke the law, identifying an owner of the vehicle, issuing a ticket to the owner of the vehicle, and/or the like. The owner of the vehicle, in turn, may consume resources responding to the ticket, correcting an issue with the one or more light detection components, and/or the like. As another example, due to the vehicle being involved in a collision, the vehicle may suffer hardware damage and/or cause hardware damage in one or more other objects. As a result, resources may be consumed repairing and/or replacing damaged hardware of the vehicle and/or the one or more other objects. Furthermore, in response to the collision, a law enforcement agency may consume resources (e.g., computing resources, network resources, vehicle resources, and/or the like) responding to calls about the collision, identifying a location of the collision, clearing a scene of the collision, and/or the like.

Some implementations described herein provide a system that is configured to accurately detect specific wavelengths of light from a traffic signal. The system may include a light sensor, a lens, and a filter arranged in a particular configuration. The lens may include a distal end positioned toward an environment and a proximal end that is opposite the distal end and positioned toward the light sensor. The filter may be situated between the light sensor and the proximal end of the lens and may be configured to permit a preconfigured set of wavelengths of light from the environment to be sensed by the light sensor. Such a configuration may permit light to sequentially pass through the lens, from the distal end to the proximal end, and the filter to reach the light sensor. By placing the filter at the proximal end of the lens, the system may avoid issues with color distortion (e.g., angle distortion effect, blue shift, and/or the like), which may prevent the system from accurately detecting a color of light from a traffic signal.

By utilizing a system that is configured to accurately detect light from a traffic signal, a vehicle may comply with traffic laws or assist a driver of the vehicle in complying with traffic laws, avoid collisions or assist the driver of the vehicle in avoiding collisions, and/or the like. For example, by complying with traffic laws, the vehicle may conserve resources (e.g., computing resources, network resources, vehicle resources, and/or the like) that might otherwise have been consumed by a law enforcement agency detecting that the vehicle broke the law, identifying an owner of the vehicle, issuing a ticket to the owner of the vehicle, and/or the like. The owner of the vehicle, in turn, may conserve resources that might otherwise have been consumed responding to the ticket, correcting an issue with the one or more light detection components, and/or the like. As another example, by avoiding collisions, the vehicle may avoid hardware damage and/or avoid causing hardware damage in one or more other objects. As a result, resources may be conserved that might have otherwise been consumed repairing and/or replacing damaged hardware of the vehicle and/or the one or more other objects. Furthermore, the vehicle may conserve resources that might otherwise have been consumed by a law enforcement agency responding to calls about the collision, identifying a location of the collision, clearing a scene of the collision, and/or the like.

To simplify explanation below, the same reference numbers may be used to denote like features. The drawings are for illustrative purposes and may not be to scale.

Figure 1:
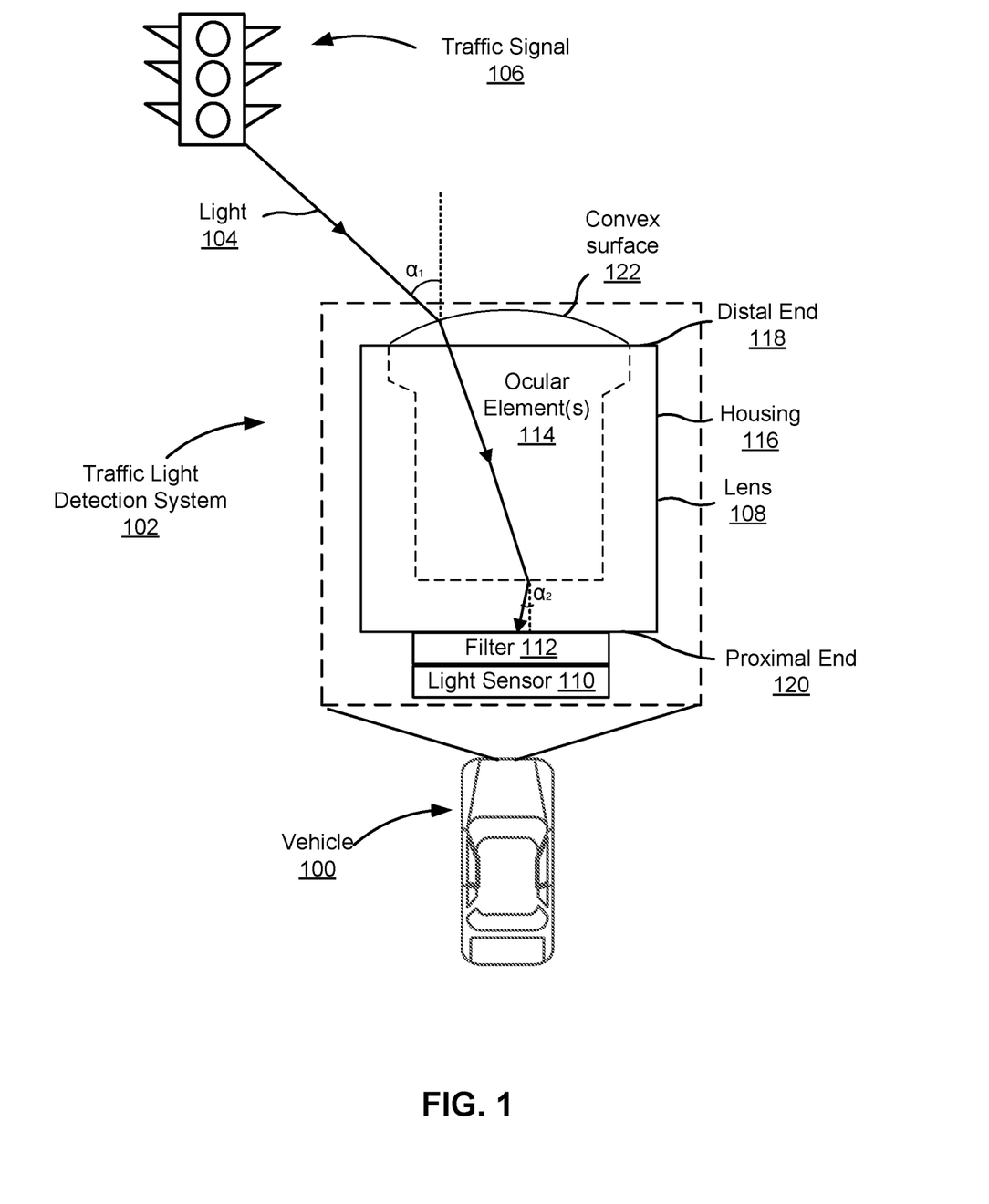
FIG. 1 is a diagram of an example vehicle using a traffic light detection system to detect light from a traffic signal.

FIG. 1 is a diagram of an example vehicle 100 using a traffic light detection system 102 to detect light 104 from a traffic signal 106. The vehicle 100 may be an autonomous vehicle, a vehicle with a driver assistance system (DAS), and/or the like. For example, the vehicle may be an automobile (e.g., a car, a truck, a bus, and/or the like), a motorcycle, a bicycle, a cart, and/or the like. The vehicle 100 may be configured to transport people, animals, and/or goods via a system of roadways (e.g., streets, parkways, lanes, highways, and/or the like) and be subject to one or more traffic laws. The one or more traffic laws may require, for example, the vehicle to perform certain actions based on the traffic signal 106 illuminating the light 104, which may be a red light, a green light, or a yellow light. For example, the one or more traffic laws may require the vehicle 100 to stop at the red light, go at the green light, and exercise caution at the yellow light.

To accurately perceive the light 104, the vehicle 100 may include the traffic light detection system 102. The traffic light detection system 102 may be mounted to a front surface of the vehicle 100 (e.g., a windshield, an engine hood, a grille, a front panel, and/or the like) to allow the traffic light detection system 102 to face the traffic signal 106 and detect the light 104 projecting therefrom. The traffic light detection system 102 may include a lens 108, a light sensor 110, and a filter 112, which together define a camera.

The lens 108 includes one or more optical elements 114 (e.g., one or more glass elements, one or more plastic elements, and/or the like) to provide light to the light sensor 110 via the filter 112. For example, the lens 108 may include a fisheye lens, a telephoto lens, a wide angle lens, and/or the like. The lens 108 may be arranged within a housing 116. The housing 116 may include a distal end 118, which is positioned toward an environment including the traffic signal 106, and a proximal end 120, which is opposite the distal end 118 and positioned toward the light sensor 110.

The light sensor 110 includes an electronic device that is configured to convert the light into an electrical signal and transmit the signal to one or more other vehicle components. The light sensor 110 may include a complementary metal oxide semiconductor (CMOS) sensor, a charge coupled device (CCD) sensor, and/or the like. The light sensor 110 may be attached to a substrate (e.g., the substrate 208, which will be described in further detail in connection with FIGS. 2A-2C), which may in turn be attached to the vehicle 100.

The filter 112 includes a base material (e.g., a plastic material, a glass material, and/or the like) and one or more coatings that are configured to selectively absorb or reflect certain wavelengths of light while permitting remaining wavelengths of light to travel through the filter 112. For example, the filter 112 may include a bandpass filter, a shortpass filter, a longpass filter, and/or the like. In order to filter the wavelengths of light before the light reaches the light sensor 110, the filter 112 may be situated between the proximal end 120 of the housing 116 and the light sensor 110.

For example, the filter 112 may be configured to permit a preconfigured set of wavelengths of light from the environment to be sensed by the light sensor 110. The preconfigured set of wavelengths of light may be associated with colors of light of the traffic signal 106 (e.g., red, yellow, and green). The preconfigured set of wavelengths of light may include, for example, a first band that is within a first threshold range of 640 nanometers (nm) and corresponds to the color red, a second band that is within a second threshold range of 580 nm and corresponds to the color yellow, and/or a third band that is within a third threshold range of 520 nm and corresponds to the color green.

In some implementations, the first threshold range may be approximately 40 nm. For example, the first band may include approximately 640 nm±40 nm, which is approximately 600 nm to approximately 680 nm. In some implementations, the first threshold range may be approximately 20 nm. For example, the first band may include approximately 640 nm±20 nm, which is approximately 620 nm to approximately 660 nm. In some implementations, the first threshold range may be approximately 10 nm. For example, the first band may include 640 nm±10 nm, which is approximately 630 nm to approximately 650 nm.

In some implementations, the second threshold range may be approximately 40 nm. For example, the second band may include approximately 580 nm±40 nm, which is approximately 550 nm to approximately 620 nm. In some implementations, the second threshold range may be approximately 20 nm. For example, the second band may include approximately 580 nm±20 nm, which is approximately 560 nm to approximately 600 nm. In some implementations, the second threshold range may be approximately 10 nm. For example, the second band may include approximately 580 nm±10 nm, which is approximately 570 nm to approximately 590 nm.

In some implementations, the third threshold range may be approximately 40 nm. For example, the third band may include approximately 520 nm±40 nm, which is approximately 480 nm to approximately 560 nm. In some implementations, the third threshold range may be approximately 20 nm. For example, the third band may include approximately 520 nm±20 nm, which is approximately 500 nm to approximately 540 nm. In some implementations, the third threshold range may be approximately 10 nm. For example, the third band may include approximately 520 nm±10 nm, which is approximately 510 nm to approximately 530 nm.

By selectively blocking wavelengths of light that are not relevant to analysis of the traffic signal 106, the filter 112 may conserve resources that might otherwise have been consumed by the light sensor 110 detecting and analyzing irrelevant colors of light, such as blue, purple, brown, and/or the like.

In use, once the traffic signal 106 illuminates the light 104 (e.g., based on a predetermined schedule, based on traffic patterns, based on receiving an instruction, and/or the like), the light 104 may contact a convex surface 122 of the one or more optical elements 114 at a first angle of incidence α1, which is an angle relative to a longitudinal axis of the lens 108. The first angle of incidence α1 may be within a first angle range. For example, the first angle range may be approximately 0 degrees to approximately 90 degrees relative to the longitudinal axis. As another example, the first angle range may be approximately 0 degrees to approximately 45 degrees relative to the longitudinal axis. As a further example, the first angle range may be approximately 0 degrees to approximately 15 degrees relative to the longitudinal axis.

The lens 108 may be shaped to direct the light 104 from the environment to the filter 112 within a threshold angle of the longitudinal axis. For example, the threshold angle may be 3 degrees, 1 degree, and/or the like. In this example, the light 104 may travel through the one or more optical elements 114 to contact the filter 112 at a second angle of incidence α2.

By directing the light 104 to enter the filter 112 at an angle less than or equal to the threshold angle of the longitudinal axis, the lens 108 may minimize color distortion (e.g., due to blue shift, angle distortion effect, and/or the like) and thus ensure effectiveness of the filter 112. Otherwise, if the light 104 were to penetrate the filter 112 at an angle larger than the threshold angle (e.g., based on the lens 108 failing to direct the light 104 at an angle within the threshold angle, based on the filter 112 being arranged at the distal end 118 of the housing 116 such that the lens 108 is located between the filter 112 and the light sensor 110, and/or the like), the filter 112 may distort the color of the light 104 prior to reaching the light sensor 110. As a result, in such an example, the light sensor 110 may misinterpret the light 104 from the traffic signal 106 and cause the vehicle 100 to perform one or more ill-suited actions (e.g., drive through a red light, stop at a green light, and/or the like).

Accordingly, the configuration of the lens 108 and the filter 112 may conserve resources that might otherwise have been consumed based on misinterpretation of the light 104 from the traffic signal 106. For example, the configuration may conserve resources (e.g., computing resources, network resources, vehicle resources, and/or the like) that might otherwise have been consumed by law enforcement responding to a collision, enforcing one or more traffic laws, and or the like. As another example, the configuration may prevent hardware damage as a result of a collision and conserve resources that might otherwise have been consumed repairing the hardware damage.

Because a wavelength of the light 104 is within the first band, the second band, or the third band, the filter 112 may permit the light 104 to reach the light sensor 110. Once the light 104 contacts the light sensor 110, the light sensor 110 may convert the light 104 into an electrical signal. Based on the color of the light 104, the light sensor 110 may transmit the electrical signal to one or more other vehicle components to cause the vehicle 100 to perform one or more actions. For example, the one or more actions may include providing one or more warning indications to a driver of the vehicle 100 based on the light 104 being a red light or a yellow light. The one or more warning indications may include a warning message (e.g., an audio message, a visual message, an audio-visual message, and/or the like), a tactile signal (e.g., a vibrating steering wheel, a vibrating seat, and/or the like), and/or the like. The one or more warning indications may encourage the driver to reduce a speed of the vehicle 100 in response to the red light or the yellow light. As another example, the one or more actions may include reducing a speed of the vehicle 100 based on the light 104 being a red light or a yellow light. To reduce the speed, the vehicle 100 may apply one or more braking mechanisms of the vehicle 100 (e.g., a friction braking mechanism, a magnetic braking mechanism, an engine braking mechanism, and/or the like).

As indicated above, FIG. 1 is provided as an example. Other examples may differ from what was described in connection with FIG. 1. For example, while the traffic light detection system 102 is shown and described as having a single lens (e.g., the lens 108), a single filter (e.g., the filter 112), and a single light sensor (e.g., the light sensor 110), it should be understood that the traffic light detection system 102, as will be described in more detail below in connection with FIGS. 2A-2C, may include a plurality of lenses, a plurality of filters, and/or a plurality of sensors. Furthermore, there may be additional devices, fewer devices, different devices, or differently arranged devices than those shown in FIG. 1.

Figure 2A:
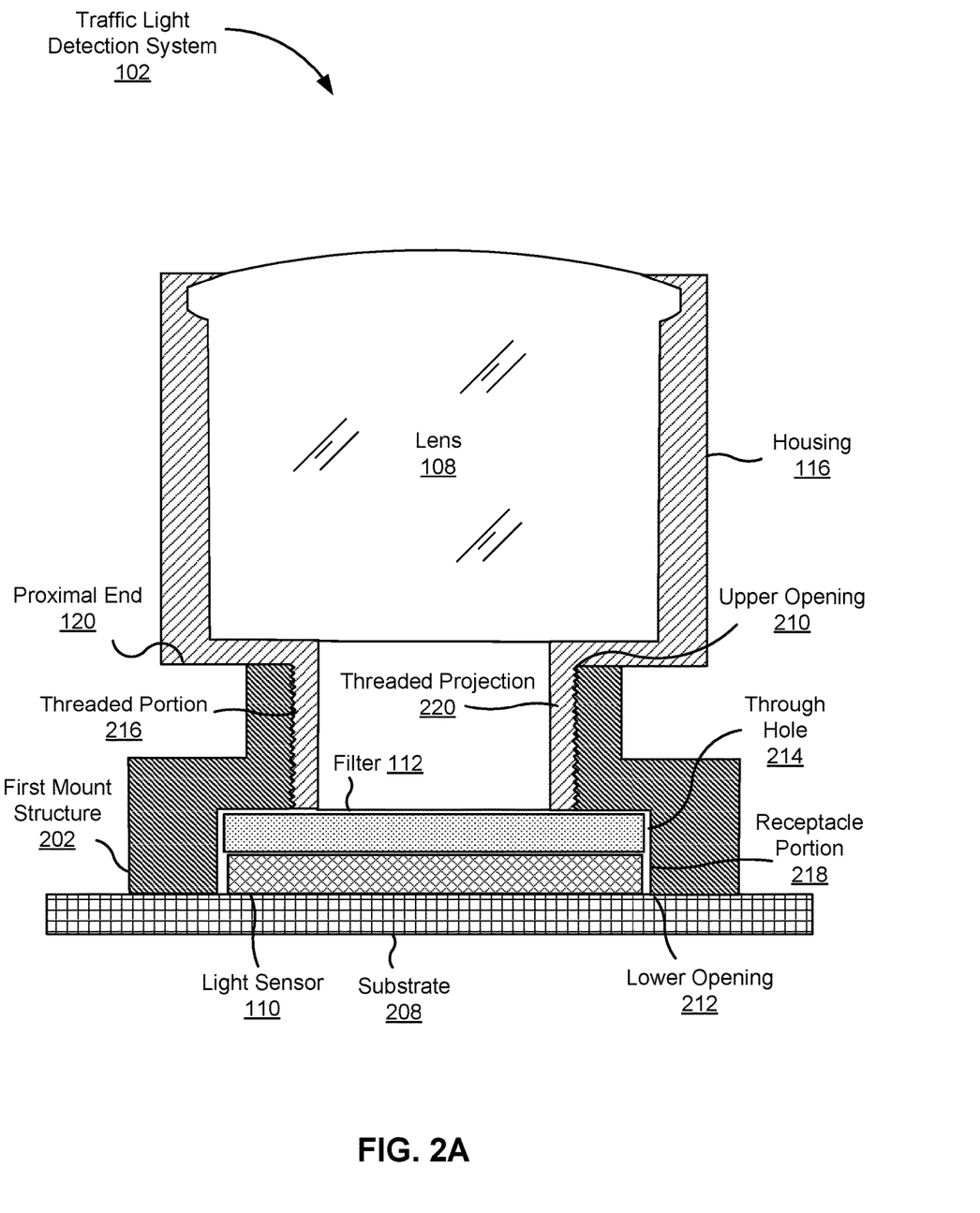
FIGS. 2A-2C are diagrams of one or more example implementations of the traffic light detection system.
Figure 2B:
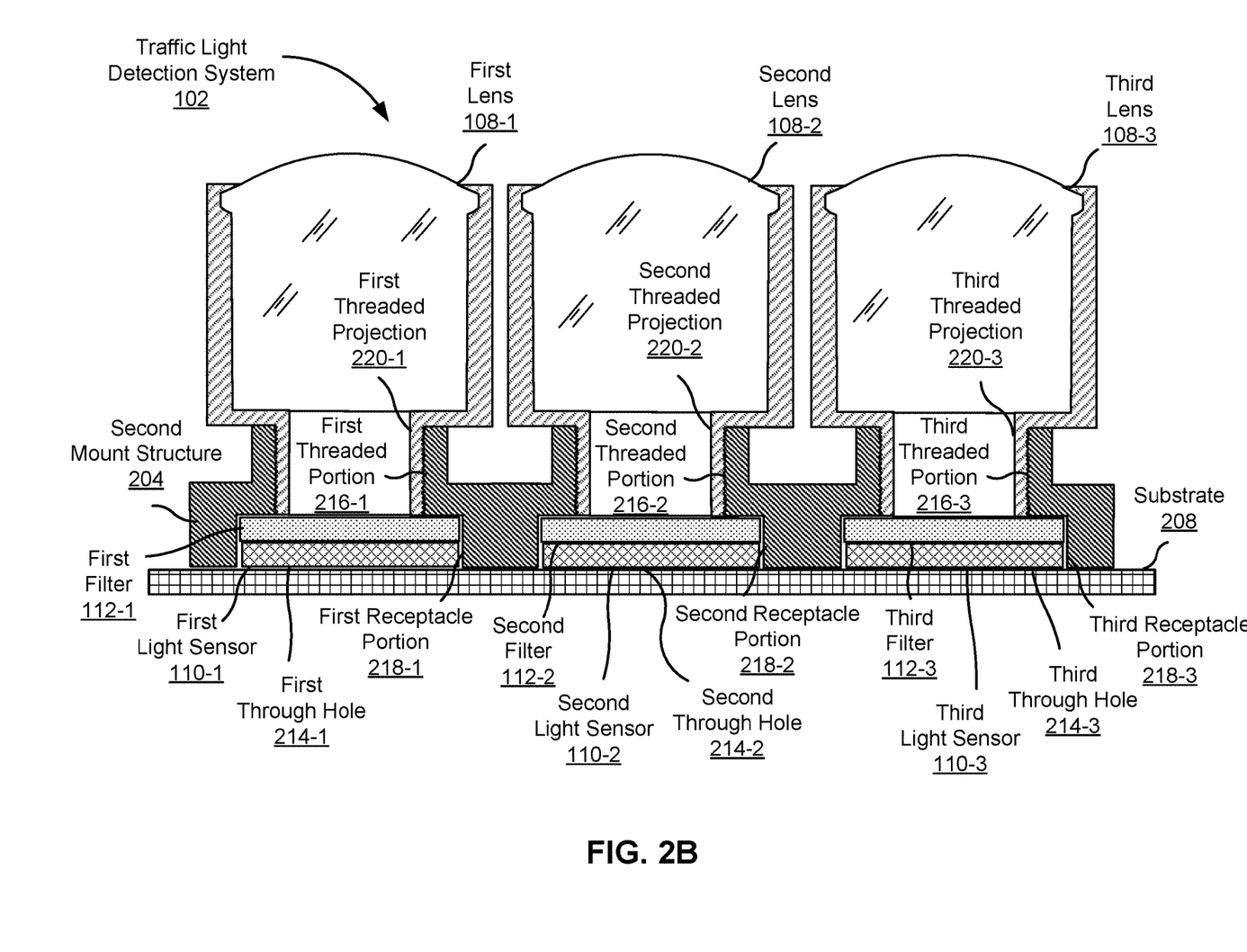
Figure 2C:
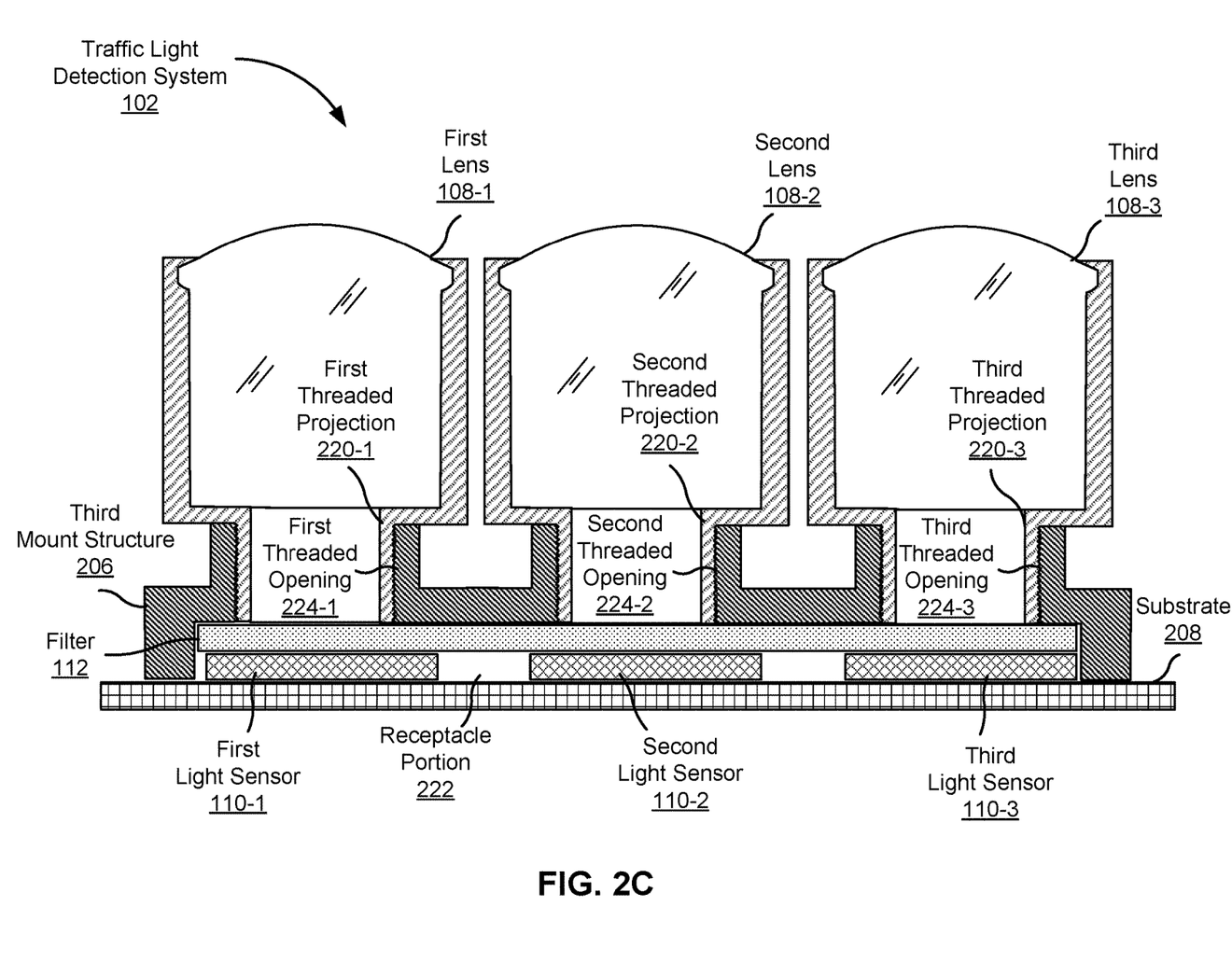

FIGS. 2A-2C are diagrams of one or more example implementations of the traffic light detection system 102. FIG. 2A is a diagram of the traffic light detection system 102 having a first mount structure 202, which is configured to attach a single lens (e.g., the lens 108) with a single filter (e.g., the filter 112) and a single light sensor (e.g., the light sensor 110). FIG. 2B is a diagram of the traffic light detection system 102 having a second mount structure 204, which is configured to attach a plurality of lenses (e.g., a first lens 108-1, a second lens 108-2, a third lens 108-3, and/or the like) with a plurality of filters (e.g., a first filter 112-1, a second filter 112-2, a third filter 112-3, and/or the like) and a plurality of light sensors (e.g., a first light sensor 110-1, a second light sensor 110-2, a third light sensor 110-3, and/or the like). FIG. 2C is a diagram of the traffic light detection system 102 having a third mount structure 206, which is configured to attach a plurality of lenses (e.g., the first lens 108-1, the second lens 108-2, the third lens 108-3, and/or the like) with a single filter (e.g., the filter 112) and a plurality of light sensors (e.g., the first light sensor 110-1, the second light sensor 110-2, the third light sensor 110-3, and/or the like).

As shown in FIG. 2A, to enable the light sensor 110 to communicate with the one or more other vehicle components, the light sensor 110 may be soldered or otherwise attached to a substrate 208, which may in turn be attached to the vehicle 100. The substrate 208 may be, for example, a printed circuit board (PCB), an integrated circuit chip substrate, and/or the like. To secure and align the lens 108, the filter 112, and the light sensor 110, the lens 108 and the filter 112 may be attached to the substrate 208 via the first mount structure 202. The first mount structure 202 may include an upper opening 210 and a lower opening 212 which together define a through hole 214. The upper opening 210 may have a width smaller than a width of the lower opening 212. The through hole 214 may include a threaded portion 216 that is adjacent to the upper opening 210 and a receptacle portion 218 that is adjacent to the lower opening 212. The threaded portion 216 may have a width substantially the same as the width of the upper opening 210. The receptacle portion 218 may have a width substantially the same as the width of the lower opening 212.

To attach the lens 108 to the first mount structure 202, a threaded projection 220, extending from the housing 116 of the lens 108, may be threadably received within the threaded portion 216 of the through hole 214. To attach the filter 112 to the first mount structure 202, the filter 112 may be received within the receptacle portion 218 of the through hole 214. The filter 112 may have a width larger than the width of the upper opening 210. In some implementations, the width of the filter 112 may be substantially the same as the width of the lower opening 212. In some implementations, to ensure that the filter 112 does not move relative to the light sensor 110, the filter 112 may be secured within the receptacle portion 218 via an attachment mechanism (e.g., a friction-fit attachment, an adhesive attachment, and/or the like). With the lens 108 and the filter 112 attached to the first mount structure 202, the light sensor 110 may be received within the receptacle portion 218 of the through hole 214, such that the light sensor 110 is adjacent to the filter 112. Once the threaded projection 220 of the lens 208, the filter 112, and the light sensor 110 are in place within the through hole 214 of the first mount structure 202, the first mount structure 202 may be attached to the substrate 208 (e.g., via a plurality of threaded fasteners extending through a flange of the substrate 208, via soldering, via gluing, and/or the like).

In such an example, because the filter 112 is arranged between the lens 108 and the light sensor 110, the width of the filter 112 may be greater than or equal to a width of the light sensor 110 and smaller than a width of the lens 108. Thus, the arrangement of the filter 112 relative to the lens 108 and the light sensor 110 may conserve costs and/or resources that might otherwise have been consumed producing and/or obtaining the filter 112 in a larger size to cover the convex surface 122 of the one or more optical elements 114.

While the traffic light detection system 102 of FIG. 2A shows a single lens (e.g., the lens 108) secured to a single filter (e.g., the filter 112) and a single light sensor (e.g., the light sensor 110), it should be understood, as indicated above, that the traffic light detection system 102 may include a plurality of lenses 108, a plurality of filters, and/or a plurality of light sensors. For example, the traffic light detection system 102 may include a plurality of lenses 108 attached, via a respective plurality of first mount structures 202, to a respective plurality of filters 112 and a respective plurality of light sensors 110.

In such an example, the plurality of lenses 108 may include lenses having the same characteristics (e.g., the same ranges, the same focal lengths, the same brands, and/or the like) and/or lenses having different characteristics (e.g., different ranges, different focal lengths, different brands, and/or the like). For example, to detect the light 104 of the traffic signal 106 from various distances, the plurality of lenses 108 may have different ranges and thus be configured to receive the light 104 from different fields of view. The different fields of view may comprise, for example, a long range field of view, a short range field of view, and a mid-range field of view. The long range field of view may enable a first lens, of the plurality of lenses 108, to receive the light 104 from the environment beyond a first threshold distance (e.g., 200 meters (m), 250 m, and/or the like). The short range field of view may enable a second lens, of the plurality of lenses 108, to receive the light 104 from the environment within a second threshold distance (e.g., 50 m, 100 m, and/or the like). The mid-range field of view may enable a third lens, of the plurality of lenses 108, to receive the light 104 from the environment between the first threshold distance and the second threshold distance.

By including the plurality of lenses 108 rather than a single lens, the traffic light detection system 102 may have greater ability to perceive the light 104 (e.g., across a wider field of view, a longer field of view, and/or the like) and, as a result, may improve responsiveness of the vehicle 100 to the traffic signal 106. Additionally, or alternatively, the traffic light detection system 102, by including the plurality of lenses 108, may have greater accuracy in interpreting the light 104 (e.g., by utilizing one lens of the plurality of lenses 108 to confirm results from one or more other lenses of the plurality of lenses 108, and/or the like). Thus, the plurality of lenses 108 may conserve resources that might otherwise have been consumed rectifying consequences of a delayed detection of the light 104 and/or a misinterpretation of the light 104.

As stated above, in some implementations, the traffic light detection system 102 of FIG. 2A may include a plurality of filters 112, attached to the vehicle 100 via respective first mount structures 202. The plurality of filters 112 may include filters of the same type, filters of different types, filters permitting respective subsets of the first band, the second band, or the third band, filters permitting respective ones of the first band, the second band, or the third band, and/or the like. For example, the plurality of filters 112 may include a filter permitting only the first band, a filter permitting only the second band, and a filter permitting only the third band.

In such an example, the plurality of filters 112 may simplify analysis of the light 104 by transmitting the light 104 to respective light sensors of the plurality of light sensors 110 based on the color of the light 104. For example, a first filter may transmit the light 104 to a first light sensor based on the light 104 being red, a second filter may transmit the light 104 to a second light sensor based on the light 104 being green, and a third filter may transmit the light 104 to a third light sensor based on the light 104 being yellow. Because the plurality of light sensors 110 may be configured to recognize the color of the light 104 merely by receiving the light 104, the plurality of filters 112 may conserve resources that might otherwise have been consumed by the light sensor 110 analyzing the color of the light 104.

As indicated above, FIG. 2A is provided as an example. Other examples may differ from what was described in connection with FIG. 2A. For example, while the lens 108 has been described as being attached to the first mount structure 202 via a threaded attachment mechanism (e.g., the threaded portion 216 and the threaded projection 220), it should be understood that other types of attachment mechanisms are possible. For example, the lens 108 may include internal threads that engage with external threads of the first mount structure 202. As further examples, the lens 108 and the first mount structure 202 may be attached via a friction-fit attachment, via a snap-fit attachment, via an adhesive attachment, and/or the like.

In FIGS. 2B-2C, it should be understood that the traffic light detection system 102 is substantially the same as the traffic light detection system 102 of FIG. 2A. Thus, to eliminate redundancy and simplify explanation, the description of FIGS. 2B and 2C will focus on differences in structure.

As shown in FIG. 2B, the second mount structure 204 may include a first through hole 214-1, a second through hole 214-2, and a third through hole 214-3. Similar to that described above with respect to FIG. 2A, the first through hole 214-1 may include a first threaded portion 216-1, for receiving a first threaded projection 220-1 of the first lens 108-1, and a first receptacle portion 218-1, for receiving the first filter 112-1 and the first light sensor 110-1. The second through hole 214-2 may likewise include a second threaded portion 216-2, for receiving a second threaded projection 220-2 of the second lens 108-2, and a second receptacle portion 218-2, for receiving the second filter 112-2 and the second light sensor 110-2. The third through hole 214-3 may likewise include a third threaded portion 216-3, for receiving a third threaded projection 220-3 of the third lens 108-3, and a third receptacle portion 218-3, for receiving the third filter 112-3 and the third light sensor 110-3.

By utilizing the second mount structure 204 to attach the plurality of lenses (e.g., the first lens 108-1, the second lens 108-2, and the third lens 108-3) with the plurality of filters (e.g., the first filter 112-1, the second filter 112-2, and the third filter 112-3) and the plurality of light sensors (e.g., the first light sensor 110-1, the second light sensor 110-2, and the third light sensor 110-3), rather than using a plurality of mount structures (e.g., a plurality of first mount structure 202), the traffic light detection system 102 of FIG. 2B may conserve resources that might otherwise have been consumed using additional material and/or process steps to produce the plurality of mount structures, attaching the plurality of mount structures to the substrate 208, and/or the like.

As described above with respect to the traffic light detection system 102 of FIG. 2A, the first lens 108-1, the second lens 108-2, and the third lens 108-3 may have the same characteristics (e.g., the same ranges, the same focal lengths, the same brands, and/or the like) and/or different characteristics (e.g., different ranges, different focal lengths, different brands, and/or the like). Additionally, or alternatively, the first filter 112-1, the second filter 112-2, and the third filter 112-3 may be of the same type, may be of different types, may permit respective subsets of the first band, the second band, or the third band, may permit respective ones of the first band, the second band, or the third band, and/or the like.

As shown in FIG. 2C, the third mount structure 206 may include a receptacle portion 222 that adjoins a first threaded opening 224-1, a second threaded opening 224-2, and a third threaded opening 224-3. Similar to that described above with respect to FIGS. 2A-2B, the first threaded opening 224-1 may be configured to receive the first threaded projection 220-1 of the first lens 108-1. Likewise, the second threaded opening 224-2 may be configured to receive the second threaded projection 220-2 of the second lens 108-2, and the third threaded opening 224-3 may be configured to receive the third threaded projection 230-3 of the third lens 108-3. The receptacle portion 222 may be configured to receive the filter 112 along with the first light sensor 110-1, the second light sensor 110-2, and the third light sensor 110-3. In this example, the width of the filter 112 may be larger than a respective width of the first lens 108-1, the second lens 108-2, the third lens 108-3, the first light sensor 110-1, the second light sensor 110-2, and the third light sensor 110-3.

By utilizing a single filter (e.g., the filter 112) sized and arranged to engage with the plurality of lenses and the plurality of light sensors, rather than using a plurality of filters, the traffic light detection system 102 of FIG. 2C may conserve costs and/or resources that might otherwise have been consumed producing a plurality of the first mount structure 202, using additional material to produce the second mount structure 204, and/or the like.

As described above with respect to the traffic light detection system 102 of FIGS. 2A-2B, the first lens 108-1, the second lens 108-2, and the third lens 108-3 may have the same characteristics (e.g., the same ranges, the same focal lengths, the same brands, and/or the like) and/or different characteristics (e.g., different ranges, different focal lengths, different brands, and/or the like).

As indicated above, FIGS. 2B-2C are provided as examples. Other examples may differ from what was described in connection with FIGS. 2B-2C. For example, while the plurality of lenses have been described as being attached to the second mount structure 204 and the third mount structure 206 via threaded attachment mechanisms, it should be understood that other types of attachment mechanisms, such as those described above in connection with FIG. 2A, are possible. As a further example, while the plurality of lenses are shown in FIGS. 2B-2C as being arranged in a linear manner on the second mount structure 204 and the third mount structure 206, it should be understood that other arrangements are possible. For example, the plurality of lenses may be arranged in a triangular shape, may include additional lenses and be arranged in a grid shape, may include fewer lenses, and/or the like.

By utilizing a traffic light detection system 102 that is configured to accurately detect light from the traffic signal 106, the vehicle 100 may be configured to comply with traffic laws or assist the driver of the vehicle in complying with traffic laws, avoid collisions or assist the driver of the vehicle 100 in avoiding collisions, and/or the like. For example, by complying with traffic laws, the vehicle 100 may conserve resources that might otherwise have been consumed by a law enforcement agency enforcing the law, by an owner of the vehicle 100 responding to the law enforcement agency, and/or the like. As another example, by avoiding collisions, the vehicle 100 may avoid hardware damage and/or avoid causing hardware damage in one or more other objects. As a result, the vehicle 100 may conserve resources that might otherwise have been consumed repairing and/or replacing damaged hardware of the vehicle 100 and/or the one or more other objects.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A sensor arrangement comprising:
   a light sensor;
   a lens that includes:
      a distal end positioned toward an environment, and
      a proximal end that is opposite the distal end and positioned toward the light sensor, and
      one or more optical elements,
         wherein the one or more optical elements include a convex surface; and
   a filter situated between the light sensor and the proximal end of the lens,
      wherein the one or more optical elements are shaped to direct light from the environment to the filter within a threshold angle of a longitudinal axis of the filter, and
      wherein the filter is configured to permit a preconfigured set of wavelengths of light from the environment to be sensed by the light sensor.

2. The sensor arrangement of claim 1, wherein the preconfigured set of wavelengths are associated with colors of a traffic light.

3. The sensor arrangement of claim 1, wherein the preconfigured set of wavelengths of light comprise:
   a first band that is within a first threshold range of 640 nanometers (nm),
   a second band that is within a second threshold range of 580 nm, and
   a third band that is within a third threshold range of 520 nm.

4. The sensor arrangement of claim 3, wherein the first threshold range, the second threshold range, and the third threshold range are a same threshold range; and
   wherein the same threshold range is less than or equal to 20 nm.

5. The sensor arrangement of claim 4, wherein the same threshold range is less than or equal to 10 nm.

6. The sensor arrangement of claim 1, wherein the light sensor is configured to be attached to a printed circuit board (PCB),
   wherein the filter is mounted within a receptacle portion of a mount structure that is configured to retain the light sensor between the mount structure and the PCB, and
   wherein the mount structure is configured to be attached to the lens.

7. The sensor arrangement of claim 1, wherein the sensor arrangement is a camera.

8. A sensor package comprising:
   a substrate;
   a light sensor that is attached to the substrate;
   a mount structure that is attached to the substrate and retains the light sensor within a receptacle portion formed by the mount structure;
   a lens that includes one or more optical elements,
      wherein the one or more optical elements include a convex surface; and
   a filter situated within the receptacle portion and between the light sensor and the lens,
      wherein the one or more optical elements are shaped to direct light from an environment to the filter within a threshold angle of a longitudinal axis of the filter, and
      wherein the filter is configured to permit a preconfigured set of wavelengths of light to pass from the lens to the light sensor.

9. The sensor package of claim 8, wherein the lens is configured to be mounted to the mount structure.

10. The sensor package of claim 8, wherein the lens is configured to be mounted to the mount structure via a threaded portion of the mount structure.

11. The sensor package of claim 8, wherein the preconfigured set of wavelengths of light comprise:
   a first band that is within a first threshold range of 640 nanometers (nm),
   a second band that is within a second threshold range of 580 nm, and
   a third band that is within a third threshold range of 520 nm.

12. A traffic light detection system comprising:
   a plurality of lenses,
      wherein each of the plurality of lenses is configured to receive light from different fields of view, and
      wherein the plurality of lenses include one or more optical elements,
         wherein the one or more optical elements include a convex surface;
   one or more light sensors configured to sense light received from the plurality of lenses; and
   one or more filters situated between the one or more light sensors and the plurality of lenses,
      wherein the one or more optical elements are shaped to direct light from the different fields of view to the one or more filters within a threshold angle of a longitudinal axis of the filter, and wherein the one or more filters are configured to permit wavelengths of light associated with a traffic signal to pass between the plurality of lenses and the one or more light sensors.

13. The traffic light detection system of claim 12, wherein the different fields of view comprise:
a long range field of view that enables a first lens, of the plurality of lenses, to receive light from an environment beyond a first threshold distance;
a short range field of view that enables a second lens, of the plurality of lenses, to receive light from an environment within a second threshold distance; and
a mid-range field of view that that enables a third lens, of the plurality of lenses, to receive light from an environment between the first threshold distance and the second threshold distance.

14. The traffic light detection system of claim 12, wherein the wavelengths of light comprise:
a first band that is within a threshold range of 640 nanometers (nm),
a second band that is within the threshold range of 580 nm, and
a third band that is within the threshold range of 520 nm.

15. The traffic light detection system of claim 14, wherein the threshold range is less than or equal to 40 nm.

16. The traffic light detection system of claim 12, wherein the one or more light sensors comprise a plurality of sensors, and
wherein each of the plurality of sensors is associated with a respective one of the plurality of lenses.

17. The traffic light detection system of claim 12, wherein the plurality of lenses are mounted to a mount structure,
wherein the mount structure is configured to retain the one or more filters and the one or more light sensors within the mount structure.

18. The sensor arrangement of claim 1, wherein the lens directs the light from the environment to the one or more optical elements within a first angle of incidence and the light travels through the one or more optical elements to contact the filter at a second angle of incidence.

19. The sensor package of claim 8, wherein the lens further includes:
a distal end positioned toward the environment, and
a proximal end that is opposite the distal end and positioned toward the light sensor.

20. The sensor package of claim 8, wherein the light sensor is configured to be attached to a printed circuit board (PCB).

* * * * *